United States Patent [19]
Vratsanos

[11] Patent Number: 5,173,516
[45] Date of Patent: Dec. 22, 1992

[54] CYCLOALIPHATIC DIAMINES AS ADDITIVES IN HIGH WATER, HIGH RESILIENCY POLYURETHANE FOAMS

[75] Inventor: Menas S. Vratsanos, Breinigsville, Pa.

[73] Assignee: Air Products and Chemicals, Inc., Allentown, Pa.

[21] Appl. No.: 499,116

[22] Filed: Mar. 26, 1990

[51] Int. Cl.$^5$ .................................................. C08G 18/14
[52] U.S. Cl. ................................. 521/115; 521/128; 521/129; 521/163; 521/166; 521/170
[58] Field of Search ............... 521/163, 110, 166, 167, 521/115, 122, 128, 129; 528/68, 74

[56] References Cited

U.S. PATENT DOCUMENTS

| | | | |
|---|---|---|---|
| 3,849,360 | 11/1974 | Farah et al. | 524/376 |
| 4,108,842 | 8/1978 | König et al. | 528/61 |
| 4,210,728 | 7/1980 | Patton | 521/160 |
| 4,248,756 | 2/1981 | König et al. | 524/589 |
| 4,293,687 | 10/1981 | Weissel et al. | 528/346 |
| 4,399,307 | 8/1983 | Shioyama | 564/437 |
| 4,503,249 | 3/1985 | Nowack et al. | 564/385 |
| 4,698,410 | 10/1987 | Straehle et al. | 528/76 |
| 4,722,946 | 2/1988 | Hostettler | 521/167 |
| 4,910,230 | 3/1990 | Tamano et al. | 521/110 |
| 5,006,501 | 4/1991 | Tamano et al. | 521/110 |
| 5,039,713 | 8/1991 | Petrella | 521/910 |

Primary Examiner—John Kight, III
Assistant Examiner—John M. Cooney, Jr.
Attorney, Agent, or Firm—Michael Leach; James C. Simmons; William F. Marsh

[57] ABSTRACT

A high water, high resiliency polyurethane foam composition comprising polyisocyanate, conventional polyol, polymer polyol, diethanolamine, silicone surfactant, water and catalyst, the improvement which comprises a cycloaliphatic diamine of the following formula:

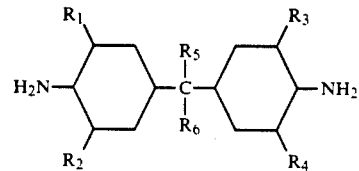

wherein $R_1$, $R_2$, $R_3$, $R_4$, $R_5$ and $R_6$ are independently hydrogen or a $C_1$–$C_4$ alkyl group, and a catalyst composition consisting essentially of 0.05 to 0.3 parts gel catalyst and 0.075 to 0.5 parts acid-blocked blowing catalyst, per 100 parts polyol.

19 Claims, No Drawings

CYCLOALIPHATIC DIAMINES AS ADDITIVES IN HIGH WATER, HIGH RESILIENCY POLYURETHANE FOAMS

TECHNICAL FIELD

The present invention relates to the use of crosslinking agents and catalyst compositions comprising gelling catalyst and blowing catalyst in polyurethane foam compositions.

BACKGROUND OF THE INVENTION

The preparation of high resiliency polyurethane foams characterized by high strength and load bearing properties by the reaction of an organic polyisocyanate with a polyol in the presence of a crosslinking agent is well known in the art. Commercial polyurethane foam molders are always trying to optimize their formulations in a cost effective fashion so as to obtain the maximum set of properties from a given set of materials and processing conditions. It is desired to improve the physical properties at equivalent density or maintain physical properties at reduced density.

Shrinkage occurs in a molded article when the trapped hot gas within unopened cells cools and causes the cells to contract. Currently, methods have been developed (foam crushing) to open the closed cells upon demolding of the article. Generally, the use of crosslinker molecules increases the closed cell content of a molded polyurethane article relative to a control formulation.

The use of aromatic diamine crosslinkers has been suggested to provide benefit in molded polyurethane foams. However, such materials have demonstrated only marginal physical property improvements when compared to control formulations. In addition, aromatic diamines and their derivatives have controversial toxicological properties and thus require special handling.

Previously, increased water levels have been used to reduce foam density and maintain physical properties. The currently used water levels cannot, however, be increased further because of processing limitations.

U.S. Pat. No. 4,210,728 discloses a reactive polyol composition useful in the preparation of high resilient polyurethane foams comprising a polyol and from 0.5 to 5.0 wt % of a reactive cycloaliphatic diamine.

U.S. Pat. No. 4,248,756 discloses thermosetting two-component coating compositions containing a prepolymer having ketoxime-blocked aromatic isocyanate groups and, as a crosslinking agent, certain diamino dicyclohexyl methanes.

U.S. Pat. No. 4,108,842 discloses a process for the production of polyurethane ureas from a prepolymer and a mixture of hardeners containing amino groups.

U.S. Pat. No. 3,849,360 discloses polyurea-urethanes made by reaction of an isocyanate-terminated polyurethane prepolymer with a diamine component containing 4,4'-bis(aminocyclohexyl)methane and one or more diamines having a single alicyclic ring.

U.S. Pat. No. 4,293,687 discloses biscyclohexylamine derivatives.

SUMMARY OF THE INVENTION

The present invention provides a high water, high resiliency polyurethane foam having improved elongation and tear and increased stiffness while being non-collapsing. High water, high resiliency polyurethane foam compositions comprise conventional polyol, polymer polyol, optionally diethanolamine, silicone surfactant, water and a catalyst system comprising a blowing catalyst and a gelling catalyst. The present invention provides for the addition to this foam composition of 0.25 to 10 parts, per 100 parts polyol, of a cycloaliphatic diamine of the following general formula:

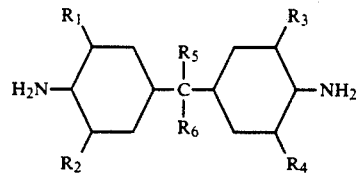

wherein $R_1$, $R_2$, $R_3$, $R_4$, $R_5$ and $R_6$ are independently hydrogen or a $C_1$–$C_4$ alkyl group, and a catalyst system comprising higher levels of an acid-blocked blowing catalyst relative to the amount of the gelling catalyst.

The above formulation provides a non-collapsing polyurethane foam, which exhibits improved elongation, improved tear, increased stiffness, increased cell opening and lower density.

DETAILED DESCRIPTION OF THE INVENTION

The high water, high resiliency polyurethane foam composition according to the invention would comprise the following ingredients:

| Foam Composition | Parts by weight* | |
|---|---|---|
| | Broad | Preferred |
| Conventional polyol | 10–90 | 40–75 |
| Polymer polyol | 90–10 | 60–25 |
| Diethanolamine | 0–2.5 | 0.75–2 |
| Silicone surfactant | 0.5–2 | 1–2 |
| Water | 2.5–5 | 2.5–4.5 |
| Diamine | 0.25–10 | 1–6 |
| Gelling catalyst | 0.05–0.3 | 0.075–0.25 |
| Blowing catalyst | 0.075–0.5 | 0.1–0.3 |
| Isocyanate Index | 90–120 | 95–115 |

*per 100 parts polyol (php)

The polyols which may be employed will generally have an equivalent weight of 1500 to 2700 and a functionality of 2 to 4. Suitable polyols include polyalkylene ether and polyester polyols with or without residual acids. The polyalkylene ether polyols include the poly(alkylene oxide) polymers such as poly(ethylene oxide) and poly(propylene oxide) polymers and copolymers with terminal hydroxyl groups derived from polyhydric compounds including diols, triols, for example, among others, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, cyclohexanediol and like low molecular weight polyols such as polytetramethylene ether glycols.

Useful polyester polyols include those produced by reacting a dicarboxylic acid with an excess of a diol, for example, adipic acid with ethylene glycol or butanediol, or reacting a lactone with an excess of a diol such as caprolactone and propylene glycol or derived from recycled polyethylene terephthalate polymers, or dimethyl terephthalate bottoms or phthalic anhydride. All are characterized as containing varying amounts of free acids capable of reacting with tertiary amines to form catalytically retarded or inactive species.

In addition to the polyether and polyester polyols, the compositions frequently contain a polymer polyol. Polymer polyols are used in polyurethane foam to increase the resistance of the foam to deformation, i.e., to increase the load bearing properties of the foam. Currently, two different types of polymer polyols are used to achieve load bearing improvement. The first type, described as a graft polyol, consists of a triol on which vinyl monomers are graft copolymerized. Styrene and acrylonitrile are the usual monomers of choice. The second type, known as a polyurea modified polyol (PHD polyol), is a polyol containing a polyurea dispersion formed by the reaction of a diamine and toluenediisocyanate (TDI). Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load bearing requirements, polyol polymers may comprise 10 to 90% of the polyol portion.

Examples of suitable organic polyisocyanates are hexamethylene diisocyanate, isophorone diisocyanate, phenylene diisocyanate, toluene diisocyanate, and 2,4' or 4,4'-methanediphenyl diisocyanate. Especially suitable are the 2,4- and 2,6-toluene diisocyanates, individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of polyisocyanates and diols, polyether polyols or polyester polyols.

The amount of polyisocyanate in the foam composition is such as to provide an isocyanate index of 90–120, preferably 95–115.

Diethanolamine may be included in the composition as a crosslinker for initial viscosity build. The preferred cell stabilizers are silicone surfactants.

Water comprises the blowing agent and is included in 2.5 to 5 parts by weight to provide a lower density foam.

Suitable gelling catalysts would include bis(dimethylaminopropyl)methylamine, triethylamine, and preferably triethylenediamine (TEDA). Suitable blowing catalysts are acid-blocked catalysts and include acid-blocked bis(dimethylaminoethyl)ether and pentamethyldiethyltriamine. It is contemplated that quaternary ammonium salt catalysts would be the functional equivalent of the acid-blocked catalysts for purposes of this invention. Gelling catalysts and acid-blocked blowing catalysts are well known to those in the polyurethane foam art.

Manufacturers of polyurethane foam typically use masterbatches, or premix compositions, consisting of one or more polyols plus water, amine catalysts and, optionally, cell stabilizers, organometallic salts, blowing agents, crosslinkers, dyes or pigments and flame retardants. These are known as the "B" side componets. The "A" side comprises the polyisocyanate materials.

The masterbatch whose temperature is typically 65° to 110° F., but usually 70° to 75° F., and the isocyanate typically held at 70° to 80° F., but may run as high as 100° F., are mixed in commercial high or low pressure machines for 0.5 to 10 seconds before being injected into the mold or poured onto the slab line bed. The mold temperature can range from ambient to 170° F., typically 110° to 155° F. The mold is closed to prevent foam from escaping. Depending upon the application/mold temperature, the cured foam will be removed from the mold in as short as one minute to thirty minutes. A typical foam residence time is 2 to 8 minutes. The demolded foam is sufficiently cured at demold to be handled without accepting any deformation.

In contrast to a polyurethane foam composition which typically contains a gelling catalyst at a 0.25–0.5 php level and a blowing catalyst at 0.05–0.2 php level, in the present invention the gelling catalyst is decreased to a 0.05–0.3 php level and the blowing catalyst is increased to a 0.075–0.5 php level, with the level of the blowing catalyst being greater than the gelling catalyst, in order to provide a non-collapsing foam.

The cycloaliphatic diamines used in the polyurethane foam compositions are represented by the following formula:

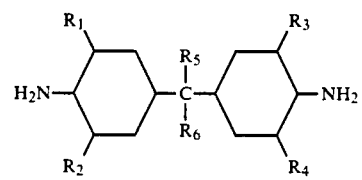

wherein $R_1$, $R_2$, $R_3$, $R_4$, $R_5$ and $R_6$ are independently hydrogen or a $C_1$–$C_4$ alkyl group such as methyl, ethyl, isopropyl, or t-butyl. These compounds may be prepared as taught in U.S. Pat. No. 4,210,728. Representative diamines include:

Bis(4-amino cyclohexyl)methane
Bis(4-amino-3-methylcyclohexyl)methane
Bis(4-amino-3,5-diethylcyclohexyl)methane
Bis(4-amino-3-t-butylcyclohexyl)methane
1,1-Bis(4-amino cyclohexyl)propane
2,2-Bis(4-amino cyclohexyl)propane
1,1-Bis(4-amino cyclohexyl)ethane
1,1-Bis(4-amino cyclohexyl)butane
2,2-Bis(4-amino-3-methylcyclohexyl)ethane
2,2-Bis(4-amino-3,5-diethyl cyclohexyl)ethane
2,2-Bis(4-amino-3,5-dimethyl cyclohexyl)propane
2,2-Bis(4-amino-3,5-dimethyl cyclohexyl)butane
2,2-Bis(4-amino-3-t-butylcyclohexyl)propane Most of the above products exist in stereo isomeric form and any isomer ratio can be employed in the present invention. The preferred cycloaliphatic diamine is bis(4-amino-3-t-butylcyclohexyl)methane, also known as di-t-butylmethylene dicyclohexylamine [DtBMDCHA].

The use of the cycloaliphatic diamine at levels of 0.25 to 10 php, preferably 1 to 6 php, and the designated catalyst system in a high water, high resiliency polyurethane foam composition provides:
Lower density
Improved physical properties
Increased cell opening
Reduced toxicity

EXAMPLE 1

In this example a set of physical properties were measured for a hand mixed control and a DtBMDCHA-modified high water, high resiliency polyurethane foam composition.

|  | Control | Invention |
| --- | --- | --- |
| Multranol 9143 | 85 | 85 |
| Multranol 9151 | 15 | 15 |
| DEOA | 1.5 | 1.5 |
| Water | 4.0 | 4.0 |
| Dabco ™ DC 5043 | 1.75 | 2.0 |
| Dabco 33-LV ® | 0.35 | 0.12 |
| Dabco ® BL-11 | 0.12 | — |
| Dabco BL-17 | — | 0.45 |
| DtBMDCHA | — | 2.0 |

Multranol 9143 polyether triol (6000 mol wt) marketed by Mobay Corp.
Multranol 9151 PHD polyol marketed by Mobay Corp.
DEOA — diethanolamine
Dabco DC-5043 silicone surfactant.

Dabco 33-LV catalyst is 33% TEDA in dipropylene glycol.
Dabco BL-11 catalyst is bis(dimethylaminoethyl) ether.
Dabco BL-17 catalyst is BL-11 catalyst acid blocked with formic acid.
DtBMDCHA — di t-butylmethylene dicyclohexylamine
Dabco products are marketed by Air Products and Chemicals, Inc.

Foams were prepared at an isocyanate index of 100 using TDI in a 16″×16″×4″ physical property mold. The foam composition was cured for 6 minutes at 140° F. and then aged at room temperature 5 to 7 days prior to testing. The following physical properties were obtained:

TABLE 1

| Property | Control | DtBMDCHA-modified |
| --- | --- | --- |
| Density (lb/ft$^3$) | 1.97 | 1.82 |
| IFD, 25% (lb) | 17.0 | 18.2 |
| IFD, 65% (lb) | 51.8 | 60.0 |
| Airflow (ft$^3$/min) | 1.55 | 2.47 |
| Tear (lb/in$^2$) | 1.72 | 2.14 |
| Tensile (lb/in$^2$) | 15.1 | 17.3 |
| Elongation (%) | 89.5 | 109.2 |
| 50% Comp. Set | 17.4 | 9.31 |
| 50% HA Comp. Set | 31.8 | 26.1 |

It can be seen from the data in Table 1 that the density of the foam was decreased while all the remaining physical properties were improved.

EXAMPLE 2

The addition of the DtBMDCHA directly into the control formulation of Example 1, resulted in a collapsed foam. This demonstrates that the incorporation of the cycloaliphatic diamines into high water, high density polyurethane foams is not a simple, direct addition.

Furthermore, the removal of the DtBMDCHA from the modified formulation resulted in a collapsed foam, thus demonstrating that the improvement in mechanical properties cannot be attributed to the catalyst changes relative to the control formulation.

EXAMPLE 3

In this example polyurethane foams were prepared using the control composition and the modified composition with and without aromatic diamines and cycloaliphatic diamines. The control (Cont) and modified (Mod) polyurethane foam compositions are set forth in Example 1. All the compositions were prepared using TDI at an isocyanate index of 100 and represent the average of 2 or 3 foam pads prepared and cured as set forth in Example 1.

TABLE 2

| Foam Composition | A Cont | B Cont | C Cont | D Mod | E Mod | F Mod | G Mod |
| --- | --- | --- | --- | --- | --- | --- | --- |
| Diamine (php) |  |  |  |  |  |  |  |
| HEDETDA | — | 3 | — | — | 3 | — | — |
| DtBMDCHA | — | — | 2 | — | — | 2 | — |
| TEMDCHA | — | — | — | — | — | — | 2 |
| Properties |  |  |  |  |  |  |  |
| Density (lb/ft$^3$) | 1.97 | 2.25 | COLLAPSED | COLLAPSED | 1.89 | 1.82 | 1.86 |
| IFD, 25% (lb) | 17.0 | 23.0 |  |  | 23.0 | 18.2 | 21.3 |
| IFD, 65% (lb) | 51.8 | 76.0 |  |  | 67.0 | 60.0 | 59.0 |
| Airflow (ft$^3$/min) | 1.55 | 0.75 |  |  | 2.40 | 2.47 | 2.76 |
| Tear (lb/in$^2$) | 1.72 | 1.6 |  |  | 1.30 | 2.14 | 1.64 |
| Tensile (lb/in$^2$) | 15.1 | 19.0 |  |  | 15.9 | 17.3 | 14.1 |
| Elongation (%) | 89.5 | 115.0 |  |  | 92.1 | 109.2 | 105.5 |
| 50% Comp Set (%) | 17.4 | 8.0 |  |  | 7.7 | 9.3 | 10.1 |
| 50% HA Com Set (%) | 31.8 | 26.5 |  |  | 35.7 | 26.1 | 37.2 |

HEDETDA: reaction product of diethyl toluenediamine and 2 moles of ethylene oxide
DtBMDCHA: Di t-butylmethylene dicyclohexylamine
TEMDCHA: Tetraethylmethylene dicyclohexylamine The control polyurethane foam composition containing the cycloaliphatic diamine and the modified polyurethane foam composition without a diamine both produced a collapsed foam. In contrast, the control composition without a diamine produced a noncollapsed foam as did the modified compositions containing diamines.

The control composition containing the aromatic diamine produced a foam having improved load bearing, reduced tear and increased density relative to the control composition. The incorporation of the same aromatic diamines to the modified foam composition produced a foam with physical properties similar to that of the control composition containing the aromatic diamine, namely improved load bearing properties at the expense of tear and density. The modified composition containing the cycloaliphatic diamines produced foams with improved properties and reduced densities.

STATEMENT OF INDUSTRIAL APPLICATION

The present invention provides high water, high resiliency polyurethane foams having a reduced density but improved physical properties.

I claim:

1. In a high resiliency foam composition comprising polyisocyanate, polyol, cycloaliphatic diamine, silicon surfactant, water and catalyst, the improvement which comprises 0.25 to 10 parts cycloaliphatic diamine and a catalyst composition consisting essentially of 0.05 to 0.3 parts gelling catalyst and 0.075 to 0.5 parts acid-blocked blowing catalyst, per 100 parts polyol, the blowing catalyst being present at a higher level than the gelling catalyst.

2. The foam composition of claim 1 in which the catalyst composition consists essentially of 0.075 to 0.25 parts gelling catalyst and 0.1 to 0.3 parts acid-blocked blowing catalyst.

3. The foam composition of claim 1 in which the gelling catalyst is bis(dimethylaminopropyl)methylamine, triethylamine or triethylenediamine.

4. The foam composition of claim 1 in which the blowing catalyst is acid-blocked bis(dimethylaminoethyl)ether or pentamethyldiethyltriamine.

5. The foam composition of claim 1 in which the cycloaliphatic diamine is bis(4-amino-3-t-butylcyclohexyl)methane.

6. In a high water, high resiliency polyurethane foam composition comprising polyisocyanate, conventional polyol, polymer polyol, diamine, diethanolamine silicone surfactant, water and catalyst, the improvement which comprises as the diamine 0.25 to 10 parts, per 100 parts polyol, cycloaliphatic diamine of the following formula:

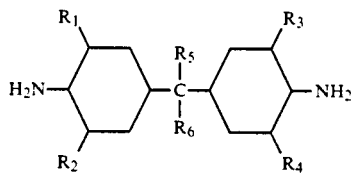

wherein $R_1$, $R_2$, $R_3$, $R_4$, $R_5$ and $R_6$ are independently hydrogen or a $C_1$–$C_4$ alkyl group, and a catalyst composition consisting essentially of 0.05 to 0.3 parts gel catalyst and 0.075 to 0.5 parts acid-blocked blowing catalyst, per 100 parts polyol, the blowing catalyst being present at a higher level than the gelling catalyst.

7. The foam composition of claim 6 in which the catalyst composition consists essentially of 0.075 to 0.25 parts gelling catalyst and 0.1 to 0.3 parts acid-blocked blowing catalyst.

8. The foam composition of claim 6 in which the gelling catalyst is bis(dimethylaminopropyl)methylamine, triethylamine or triethylenediamine.

9. The foam composition of claim 6 in which the blowing catalyst is acid-blocked bis(dimethylaminoethyl)ether or pentamethyldiethyltriamine.

10. The foam composition of claim 6 in which the cycloaliphatic diamine is bis(4-amino-3-t-butylcyclohexyl)methane.

11. The foam composition of claim 6 which contains 1 to 6 parts cycloaliphatic diamine.

12. A composition of matter comprising 0.5 to 10 parts cycloaliphatic diamine of the following formula:

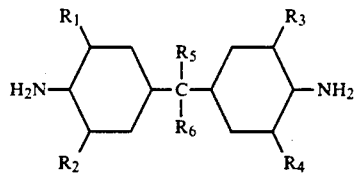

wherein $R_1$, $R_2$, $R_3$, $R_4$, $R_5$ and $R_6$ are independently hydrogen or a $C_1$–$C_4$ alkyl group, and a catalyst composition consisting essentially of 0.05 to 0.3 parts gel catalyst and 0.075 to 0.5 parts acid-blocked blowing catalyst, the blowing catalyst being present at a higher level than the gelling catalyst.

13. The composition of matter of claim 12 in which the diamine is bis(4-amino-3-t-butylcyclohexyl)methane.

14. The composition of claim 13 in which the catalyst composition consists essentially of 0.075 to 0.25 parts gelling catalyst and 0.1 to 0.3 parts acid-blocked blowing catalyst.

15. The composition of claim 14 in which the gelling catalyst is bis(dimethylaminopropyl)methylamine, triethylamine or triethylenediamine.

16. The composition of claim 15 in which the blowing catalyst is acid-blocked bis(dimethylaminoethyl)ether or pentamethyldiethyltriamine.

17. The composition of claim 14 which contains 1 to 6 parts cycloaliphatic diamine.

18. The composition of claim 15 which contains 1 to 6 parts cycloaliphatic diamine.

19. The composition of claim 16 which contains 1 to 6 parts cycloaliphatic diamine.

* * * * *